US007093339B2

(12) United States Patent
Aldana et al.

(10) Patent No.: US 7,093,339 B2

(45) Date of Patent: Aug. 22, 2006

(54) MEDIA FASTENING

(75) Inventors: Francisco Javier Ramirez Aldana, Jalisc (MX); Robert J. Lawten, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 307 days.

(21) Appl. No.: 10/644,453

(22) Filed: Aug. 20, 2003

(65) Prior Publication Data

US 2005/0039319 A1 Feb. 24, 2005

(51) Int. Cl.
*B21J 15/02* (2006.01)
*B23Q 7/10* (2006.01)
*B42B 5/08* (2006.01)

(52) U.S. Cl. .............................. 29/525.05; 29/525.01; 29/818; 412/38

(58) Field of Classification Search ............ 29/525.01, 29/525, 525.05, 428, 243.53, 243.57, 243.58, 29/818; 412/38
See application file for complete search history.

(56) References Cited

U.S. PATENT DOCUMENTS

| | | | | |
|---|---|---|---|---|
| 4,194,666 | A | 3/1980 | Spehrley, Jr. et al. | |
| 4,328,919 | A | 5/1982 | Lawrence et al. | |
| 4,344,554 | A | 8/1982 | Cross | |
| 4,557,410 | A | 12/1985 | Holden et al. | |
| 4,593,847 | A | 6/1986 | Hagemann | |
| 5,076,483 | A | 12/1991 | Olesen | |
| 5,141,143 | A | 8/1992 | Ebner et al. | |
| 5,413,266 | A | 5/1995 | Jairam | |
| 5,460,314 | A | 10/1995 | Udagawa | |
| 5,586,710 | A | 12/1996 | Golicz | |
| 5,662,318 | A | 9/1997 | Harada et al. | |
| 5,782,467 | A | 7/1998 | Johnson | |
| 5,818,186 | A | 10/1998 | Camino | |
| 5,862,971 | A | 1/1999 | Ebner | |
| H1842 | H | 3/2000 | Tontarski | |
| 6,036,074 | A | 3/2000 | Manabe | |
| 6,056,183 | A | 5/2000 | Tanabe | |
| 6,099,225 | A | 8/2000 | Allen et al. | |
| 6,164,513 | A | 12/2000 | Yoshie | |
| 6,266,871 | B1 * | 7/2001 | Edwards | 29/818 |
| 6,474,388 | B1 | 11/2002 | Boss | |
| 6,485,606 | B1 | 11/2002 | Boss | |
| 6,550,756 | B1 | 4/2003 | Trovinger | |
| 6,554,267 | B1 | 4/2003 | Trovinger | |
| 2001/0026361 | A1 | 10/2001 | Yamaguchi | |
| 2002/0140153 | A1 | 10/2002 | Trovinger et al. | |

* cited by examiner

*Primary Examiner*—John C. Hong

(57) ABSTRACT

An apparatus for closing fasteners in media includes a plurality of fastener clinches, the plurality of fastener clinches being adapted for operable engagement with a plurality of fastener dispensers, and the plurality of fastener clinches including structure adapted to generally simultaneously close a plurality of fasteners discharged by the fastener dispensers. The apparatus also includes an actuation mechanism for moving the fastener clinches to contact and close the fasteners in the media, and a drive for powering the actuation mechanism.

24 Claims, 20 Drawing Sheets

MEDIA FASTENING

BACKGROUND OF THE INVENTION

Electronic publishing, desktop publishing and other tasks involving print media or other media demand more than a stack of paper in an output tray of a laser printer or photocopier. Typically, many sheets must be bound into finished documents by a paper-handling accessory. Currently, machines exist to perform operations such as binding, folding, trimming, saddle stapling, and hole drilling. These finishing operations are typically performed on many sheets at a time, requiring high forces and powerful motors. Such machines are often expensive and large, depending on function, and often exceed the cost or footprint of desktop or office printers. As such, they are not well-suited to low-cost desktop finishing or other low-cost applications, for example.

The demands of e.g. electronic and desktop publishing are driving the need for more compact, low-cost, high-quality, and high-speed finishing machines suitable for use alone or with printers, photocopiers, and other machines. Prior-art solutions to making booklets, for example, have involved machines costing thousands of dollars for simple functions such as folding and stapling. They are often bulky, slow, and expensive. Current finishing techniques impose size, cost and power limits upon booklet-making devices and other fastening devices, and hinder the use of these devices in many applications.

SUMMARY OF THE INVENTION

An apparatus for closing fasteners in media includes a plurality of fastener clinches, the plurality of fastener clinches being adapted for operable engagement with a plurality of fastener dispensers, and the plurality of fastener clinches including structure adapted to generally simultaneously close a plurality of fasteners discharged by the fastener dispensers. The apparatus also includes an actuation mechanism for moving the fastener clinches to contact and close the fasteners in the media, and a drive for powering the actuation mechanism.

DETAILED DESCRIPTION

Figure 1:
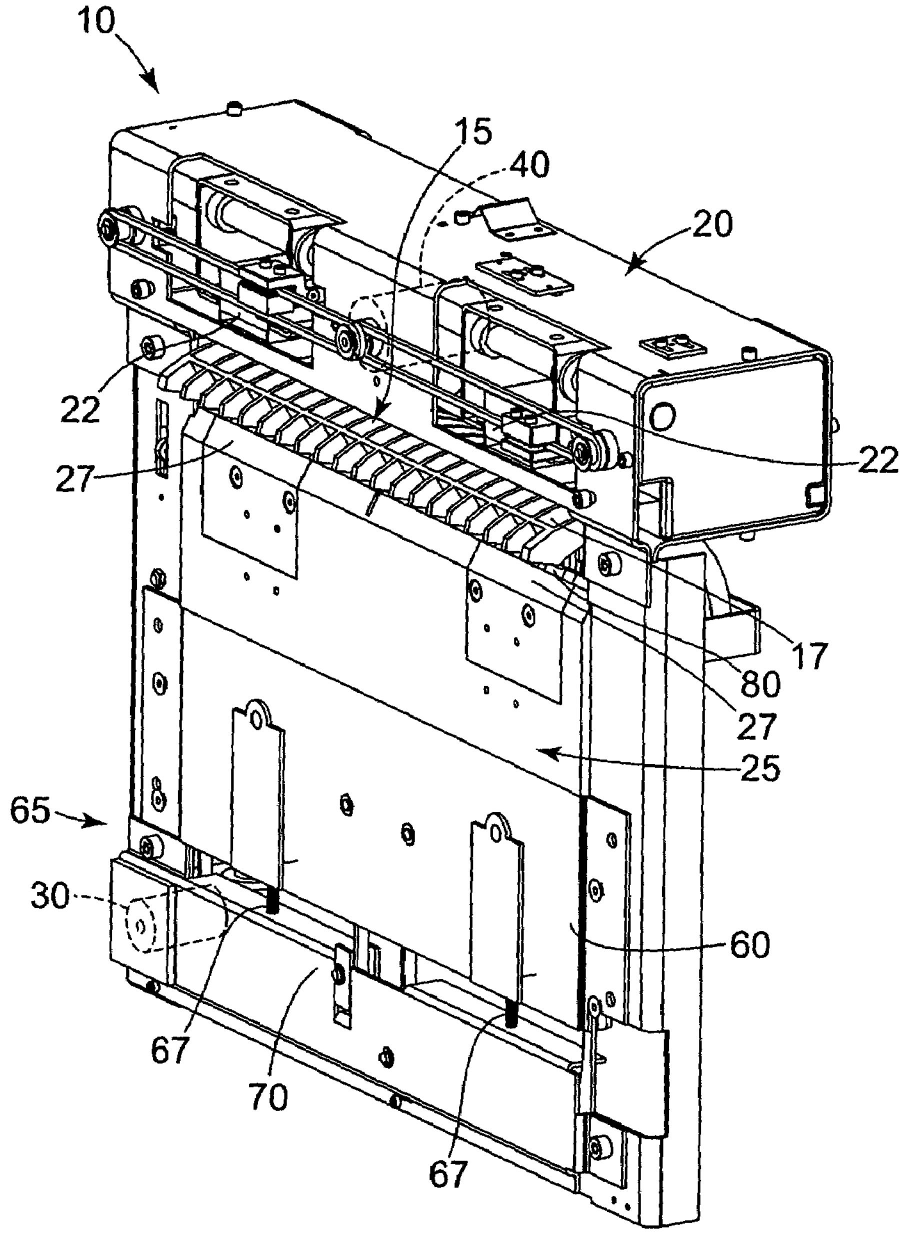
FIG. 1 is a perspective view of a fastening device, according to an embodiment of the invention.

FIG. 1 shows fastening device 10 for sheet media or other media according to an embodiment of the invention. Fastening device 10 includes media transporter assembly 15, including transporter or guide 17, for guiding, moving, or otherwise transporting media with respect to fastening device 10. Fastener head assembly 20 of fastening device 10 includes two fastener heads 22, each for discharging one or more fasteners, such as staples, into sheet media or other media transported by transporter 17. More specifically, fastener heads 22 each include a spring-loaded staple cartridge, for example, for automatically discharging one or more staples upon contact of sufficient force between fastener heads 22 and the media to be fastened. Closing assembly 25 of fastening device 10 supports the media during staple discharge, and includes two closing mechanisms 27 for closing the staples or other fasteners once they are discharged.

Each fastener head 22 of fastener head assembly is one of a plurality of fastener heads together adapted to simultaneously discharge a plurality of fasteners into sheet media or other media transported by transporter 17. Alternatively, fastening device 10 includes just one fastener head 22. Each closing mechanism 27 of closing assembly 25 is one of a plurality of closing mechanisms adapted to simultaneously close the plurality of fasteners. Alternatively, fastening device 10 includes just one closing mechanism. Each closing mechanism is adapted to close one or more fasteners that are discharged in one or more different locations relative to the media.

Fastening device 10 includes motor 30 for actuating both transporter 17 and closing mechanisms 27. More specifically, motor 30 is connected to drive belts, linkages, or other connections for simultaneously actuating transporter 17 and closing mechanisms 27. Fastening device 10 also includes motor 40 for moving the plurality of fastener heads 22 to the different desired locations relative to the media. Motors 30 and 40 are DC brush motors, according to one embodiment, although other motor types are contemplated.

Fastening device 10 also includes support body 60, for supporting closing assembly 25 and the plurality of closing mechanisms 27. Support body 60 is biased toward fastener heads 22 by compliant biasing device 65. Biasing device 65 comprises one or more compression springs 67, according to one example. Compression springs 67 are connected to frame 70 and are adapted to provide compliance between frame 70 and closing assembly 25 via support body 60, to accommodate both large-thickness or small-thickness media, or stacks of media, being fastened by fastening device 10. Biasing device 65 is also adapted to bias closing assembly 25 toward fastener heads 22. Biasing device 65 generally minimizes jamming of media in fastening device 10. More specifically, for a booklet of 1.6 mm thickness, for example, compression springs 67 compress to accommodate that thickness. For a booklet of just 0.5 mm, for example, springs 67 do not compress as much but still apply appropriate pressure to hold the media within fastening device 10 without adverse slippage or other undesired movement. Additionally, springs 67 absorb the impact force generated when fastener heads 22 discharge fasteners into the media.

Frame 70 generally surrounds support body 60. Frame 70 also supports transporter assembly 15, fastener head assembly 20, and closing assembly 25. According to one embodiment, frame 70 is a single-piece sheet-metal frame designed to handle greater than 22 kg of stress without deformation. Other materials and constructions of frame 70 also are contemplated.

Figure 2:
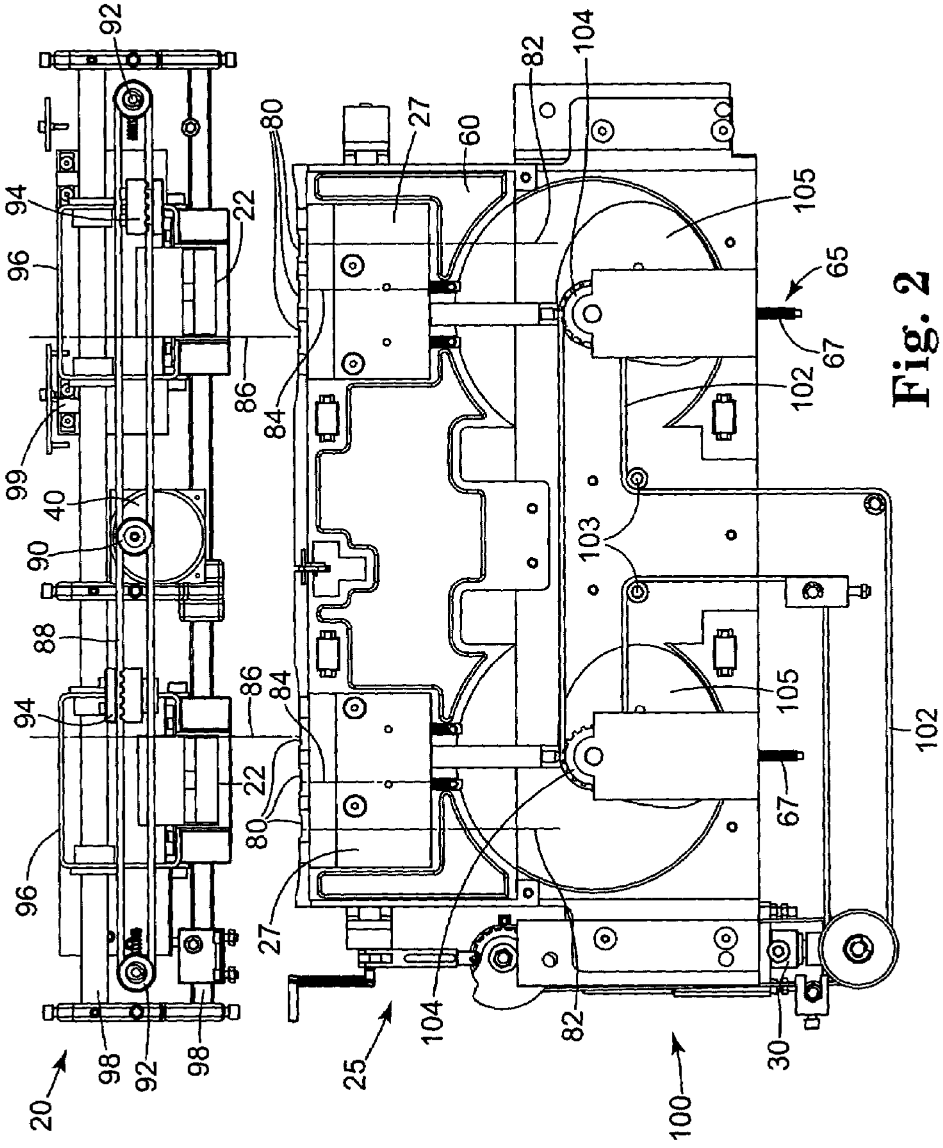
FIG. 2 is a side view of a portion of the FIG. 1 device, according to an embodiment of the invention.

As shown in FIG. 2, in which transporter 17 is omitted for clarity, each closing mechanism 27 includes three clinches 80. The three clinches 80 are generally aligned with three different positions to which fastener heads 22 are movable. Each fastener head 22 is adapted for movement to an initialization position indicated by lines 82, for example, which is also called a home position. Each fastener head 22 also is adapted for movement to a first fastener-discharge position, indicated by lines 84, and a second fastener-discharge position, indicated by lines 86. Closing mechanisms 27 are disposed to close fasteners discharged in both first fastener-discharge position 84 and second fastener-discharge position 86, and also are disposed to align with initialization position 82. According to embodiments of the invention, initialization position 82 is for staple initializing, waste accumulation, fastener head servicing or replacement, and/or repair of staple jams or other problems; i.e. it is a service position. First fastener-discharge position 84 is for media having a relatively larger fastening dimension, e.g. for an A3-size, 11-inch, or other large-spine booklet. Second fastener-discharge position 86 is for media having a relatively smaller fastening dimension, e.g. for an A5-size, 8.5×11-inch, or other small-spine booklet. According to one embodiment, fasteners are discharged either at positions 84 or 86 in the same booklet or other fastened media, but also optionally are discharged at both positions 84, 86 in the same booklet or other fastened media.

According to one embodiment, each clinch 80 aligned with service position 82 is a non-active clinch that defines a service station for fastener heads 22, and the remaining clinches 80, aligned with positions 84, 86, are active clinches. Each closing mechanism 27 optionally includes a single clinch, a pair of clinches, three clinches, or more than three clinches. In the case where the fasteners are staples, clinches 80 are staple clinches. Clinches 80 are each adapted for operable engagement with a corresponding fastener head or dispenser 22. The plurality of fastener clinches 80 are adapted to generally simultaneously close a plurality of fasteners, for example two fasteners, discharged by fastener heads or dispensers 22.

As also shown in FIG. 2, motor 40 drives belt 88 via drive wheel 90 and idler wheels 92. Belt 88 is attached to clamping blocks 94, which are rigidly attached to fastener mounts 96. Fastener mounts 96 support fastener heads 22. One clamping block 94 is mounted to an upper pass of belt 88, and the other clamping block 94 is mounted to a lower pass of belt 88, such that movement of belt 88 drives fastener heads 22 in opposite directions, either towards each other or away from each other in a direction generally parallel to the groups of clinches 80 in closing mechanisms 27. Fastener mounts 96 are supported on and slide along rails 98 to and between positions 82, 84 and 86. Optical sensor 99 is mounted to detect the position of one or more fastener heads 22 as they travel on rails 98.

Actuation mechanism 100 is supported by support body 60 and moves fastener clinches 80 to contact and close the fasteners in the media. Actuation mechanism 100 comprises motor 30, with belt or band 102 being driven by motor 30 and extending from motor 30 to closing assembly 25. Comers 103, e.g. in the form of pulleys, wheels, or other guide structure, guide belt 102 within the frame of fastening device 10 and/or within closing assembly 25. Belt 102 drives gear wheels 104, which are rigidly secured with respect to cams 105.

Figure 3:
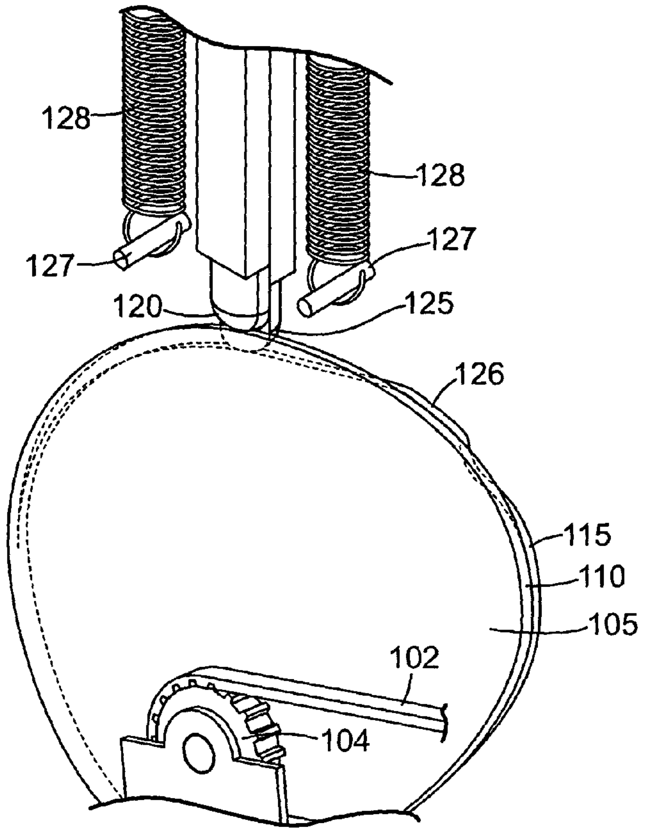
FIG. 3 is a perspective view of a portion of an actuation mechanism, according to an embodiment of the invention.

As shown in FIG. 3, each cam 105 defines two cam surfaces 110, 115. For purposes of description, a single cam 105 is considered shown in FIG. 3 and is considered to define both surfaces 110, 115. It should be appreciated, however, that cam 105 illustrated in FIG. 3 alternatively is considered to include two cams that are rigidly attached together, each defining a respective surface 110, 115. Each cam surface 110, 115 is adapted to engage and move one of two cam followers 120, 125. More specifically, cam surface 110 is adapted to drive cam follower 120 upon movement of cam 105 by motor 30. Cam follower 120 is rigidly connected to or otherwise operably connected to closing mechanism 27, including one or more fastener clinches 80 thereof. Cam follower 125 is rigidly connected to or otherwise operably connected to at least a portion of each active fastener clinch 80. Cam 105, and more specifically cam surface 115 thereof, defines outdented portion 126 to move cam follower 125, as will be described.

Bearing posts 127 are rigidly attached to closing assembly 25, and tension springs 128 are secured to bearing posts 127. Tension springs 128 are adapted to hold cam followers 120, 125 in contact with cam surfaces 110, 115. Ends of tension springs 128 opposite bearing posts 127 are fixedly attached to closing mechanism 27, e.g. to one or both of cam followers 120, 125, or structure that itself is fixedly attached to or supported with respect to cam followers 120, 125.

Figure 4:
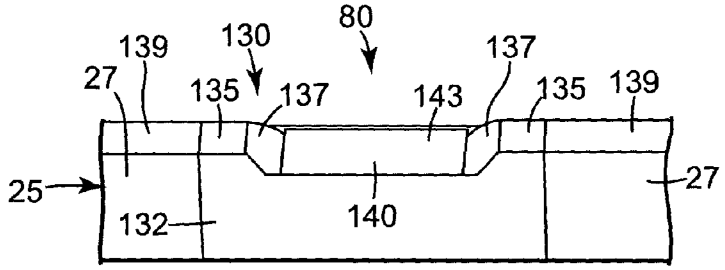
FIG. 4 is a perspective view of a fastener clinch in a first configuration, according to an embodiment of the invention.
Figure 5:
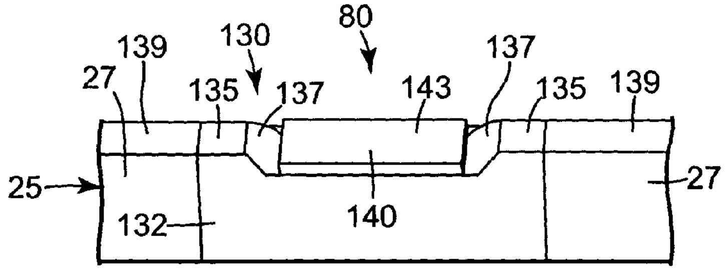
FIG. 5 is a perspective view of the FIG. 4 fastener clinch in a second configuration, according to an embodiment of the invention.

FIGS. 4–5 illustrate additional features of clinches 80 of closing assembly 25. Each clinch 80 is at least partially composed of saddle assembly 130. Saddle assembly 130 includes outer follower structure 132, also called a first saddle member, which defines first generally flat surfaces 135 and second generally flat surfaces 137 extending at an angle to first surfaces 135. Each surface 135 is generally flush with corresponding surface 139 of closing mechanism 27 of closing assembly 25. Outer follower structure 132 is rigidly or operably coupled with and driven by first cam follower 120, as previously described, and optionally is one-piece therewith.

Saddle assembly 130 also includes inner follower structure 140, also called a second saddle member, which defines generally flat surface 143 extending generally parallel with surfaces 135 and at an angle with respect to surfaces 137. Inner follower structure 140 is in a rest position in FIG. 4, but is moved from the rest position, upwardly as viewed in FIG. 4, to a clinch position in FIG. 5 in which the fastener is clinched. In the clinch position, surface 143 is above, generally flush with, or just below surfaces 135 and 139. Second saddle member or inner follower structure 140 is rigidly or operably coupled with and moved by second cam follower 125, and optionally is one-piece therewith. Second saddle member or inner follower structure 140 is disposed within first saddle member or outer follower structure 132.

Cam follower 120 is adapted to move fastener clinch 80, including both first saddle member or outer follower structure 132 and second saddle member or inner follower structure 140, toward a respective fastener held within fastener head 22. When cam follower 120 moves outer follower structure 132 toward fastener head 22 to discharge a fastener, the discharge causes ends of the fastener to pierce through the media and engage or approach angled surfaces 137. Outdented portion 126 of cam 105 is adapted to then move second cam follower 125 and inner follower structure 140 to an extended position relative to first cam follower 120 and outer follower structure 132, to close the respective fastener in the media. Such movement and closing occur when first cam follower 120 is itself in a highest or most extended position. More specifically, outdented portion 126 moves second cam follower 125 from the rest position of FIG. 4 to the clinching position of FIG. 5, raising surface 143 and causing surface 143 to contact the ends of the fastener and/or bend the ends of the fastener to a closed position.

Thus, movement of cam follower 120 causes fastener clinch 80, including outer follower structure 132 and inner follower structure 140, to move together toward an associated fastener head 22. During such movement, media positioned on or supported by outer follower structure 132, or on the remainder of closing assembly 25, moves toward fastener heads 22. In the illustrated embodiment, such movement is movement in an upward direction. Engagement of fastener head 22 by the media moved by fastener clinch 80 and the surrounding structure automatically causes discharge of a fastener from fastener head 22. Movement of cam follower 125 then occurs, due to engagement with outdented portion 126, causing movement of inner follower structure 140 relative to outer follower structure 132. Cam surface 115 drives cam follower 125, in the direction of fastener head 22, to cause inner follower structure 140 to move upwardly from the position illustrated in FIG. 4 to the position illustrated in FIG. 5, to contact the ends of the discharged fastener and close the discharged fastener in the media.

Saddle assembly 130, when used in fastening sheets together, includes first saddle member or outer follower structure 132 as an example of means for applying force to release a staple or other fastener from staple dispenser or fastener head 22. Second saddle member or inner follower structure 140 is an example of means for clinching the fastener into a closed position, with the means for clinching 140 first moving together with the means for applying 132 to both position sheets or other media and to apply the force to release the fastener from staple head or dispenser 22. Means for clinching 140 subsequently moves relative to means for applying 132 to clinch the fastener. Motor 30, first cam surface 110, first cam follower 120, second cam surface 115, and/or second cam follower 125 are an example of means for actuating both the means for applying 132 and the means for clinching 140. According to an alternative description, first cam surface 110 and first cam follower 120 are considered as part of the means for applying force 132, or as part of the first saddle member, and second cam surface 115 and second cam follower 125 as part of the means for clinching 140, or as part of the second saddle member. The means for actuating comprises a single motor 30, according to one embodiment.

Figure 6:
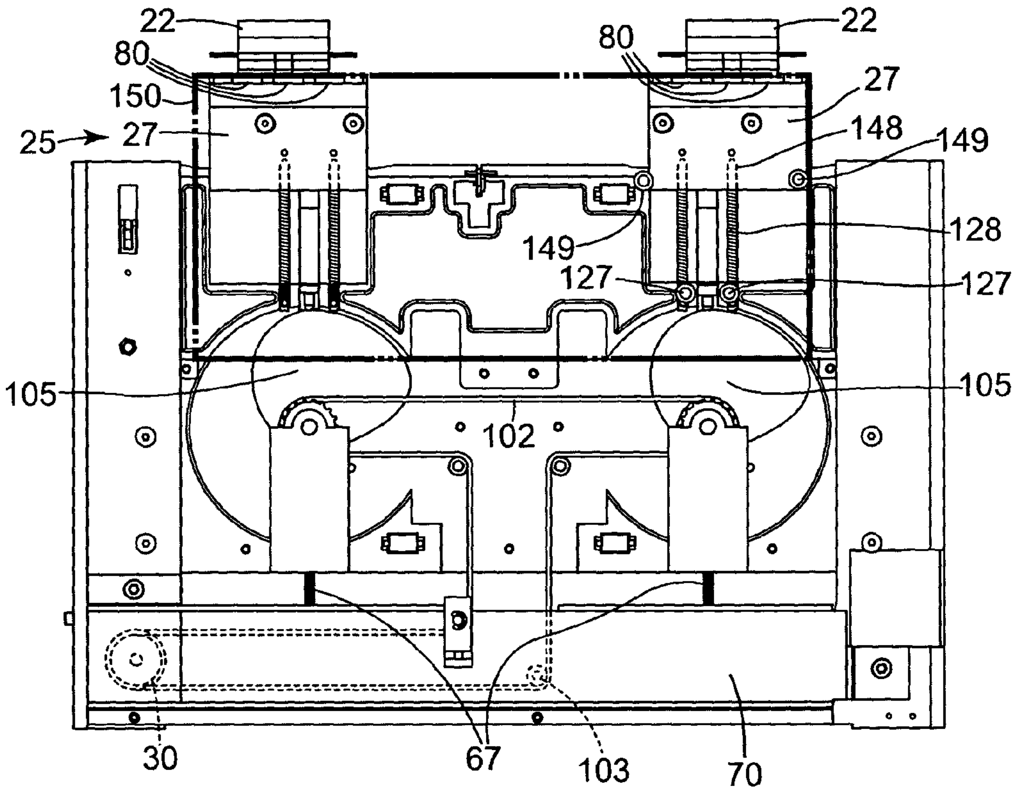
FIG. 6 is a side view of a portion of the FIG. 1 device with media, according to an embodiment of the invention.

FIG. 6 shows clinches 80 in their upwardly extended position, as moved by closing mechanisms 27. According to the illustrated embodiment, closing mechanisms 27 in their entireties move upwardly toward respective fastener heads 22. FIG. 6 also illustrates springs 128 in an extended configuration when closing mechanisms 27 are raised, to maintain contact between cams 105 and the cam followers, as described earlier herein. Ends 148 of springs 128 opposite bearing posts 127 are fixedly attached to closing mechanism 27. Additional bearing points 149 maintain alignment between each fastener head 22 and the followers 120, 125. FIG. 6 also shows media 150 positioned over closing assembly 25. Media 150 is positioned over closing assembly 25 such that a crease or central bend is created in media 150.

Thus, according to embodiments of the invention depicted in FIGS. 4–6, a top edge or spine of saddle or saddle assembly 130, including surface 139, causes a crease or bend in sheets or other media 150. Multiple stapler heads 22 are movable in a direction parallel to the spine of the sheet-receiving saddle 130, and a plurality of active clinches 80 are positioned along the spine of sheet-receiving saddle 130, wherein the multiple stapler heads 22 are moved to desired positions over active clinches 80 for generally simultaneously discharging staples into sheets 150. The plurality of active clinches 80 are operated by a common clinch motor 30 that is operated to cause discharging of staples into sheets 150. Stapling apparatus 10 also optionally includes a plurality of passive clinches 80 positioned along the spine of the sheet-receiving saddle 130, the passive clinches being aligned with service positions 82 and functioning as service stations, as previously described. Passive, service-station clinches 80 define the general shape shown in FIG. 4, for example, but do not include elevating structure for moving one portion thereof relative to another portion thereof in the manner of FIG. 5.

Figure 7:
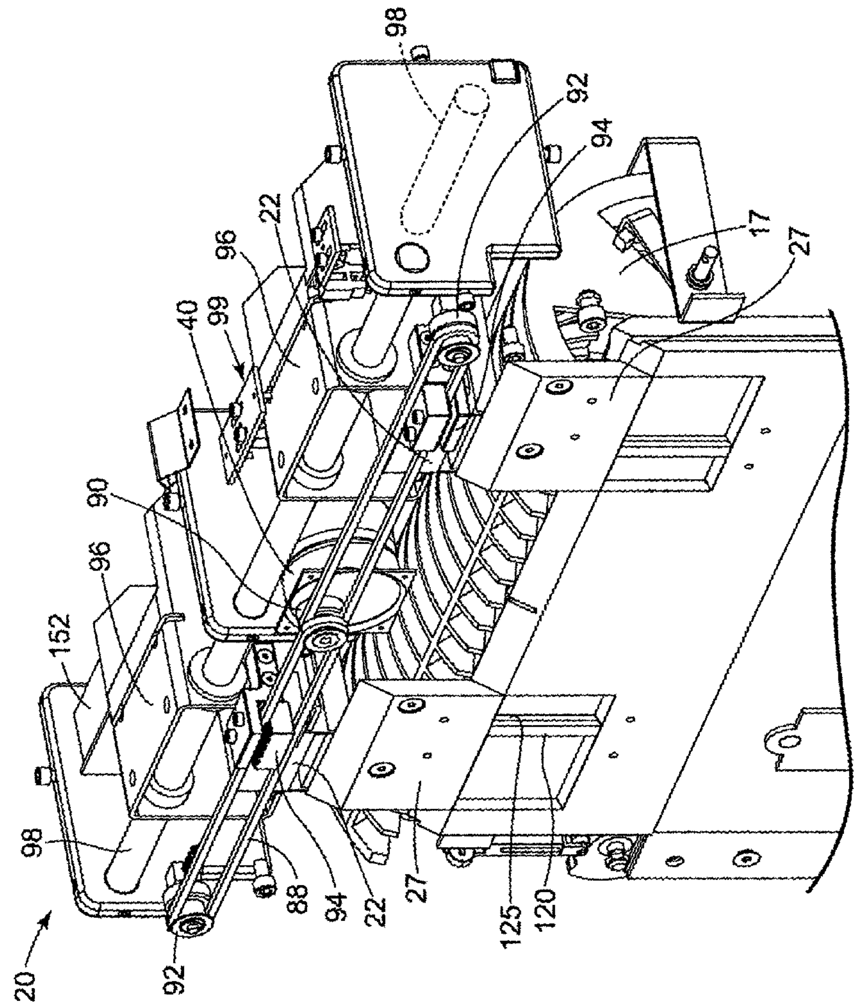
FIG. 7 is a perspective view of a portion of the FIG. 1 device, according to an embodiment of the invention.

FIG. 7 is another figure showing closing mechanisms 27 in an upwardly extended position. Features of fastening assembly 20 previously described herein are illustrated in perspective view. FIG. 7 additionally illustrates stop solenoid 152 for determining stop positions of fastener heads 22 for accurate placement at one or more of positions 82, 84, and 86, for example.

Figure 8:
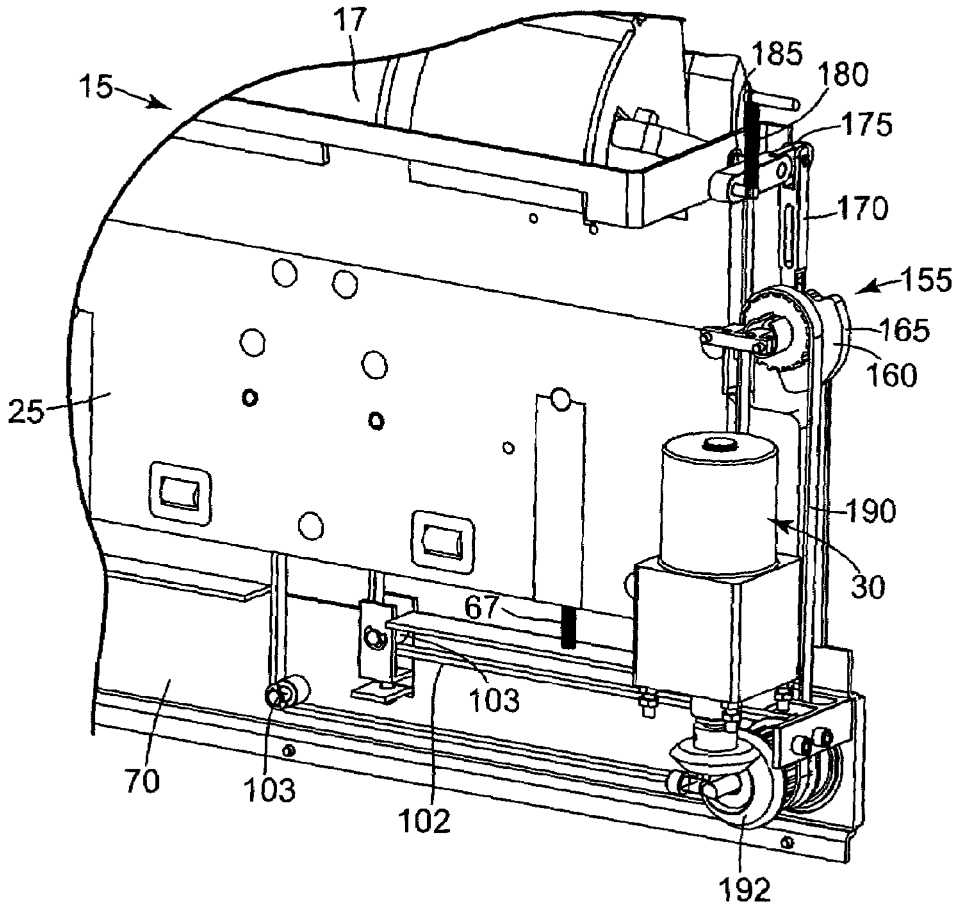
FIG. 8 is a perspective view of a portion of the FIG. 1 device, according to an embodiment of the invention.

FIG. 8 shows additional features of transporter assembly 15 and transporter 17. Transporter 17 includes a generally curved, generally concave inner surface for guiding paper or other media into a position for fastening together into a booklet or other form. Instead of including ribs, as illustrated in e.g. FIG. 1, transporter 17 is generally continuous or ribless in this embodiment. Transporter 17 aids in ejecting media from fastening device 10. Alternatively, a separate device, e.g. a caterpillar drive (not shown), optionally is used to eject or remove fastened media from device 10.

Transporter actuation mechanism 155 operably couples transporter 17 to motor 30. Actuation mechanism 155 includes transporter cam 160, which defines transporter cam surface 165 operably coupled with transporter cam follower 170. Transporter cam surface 165 is adapted to drive transporter cam follower 170 upon movement of transporter cam surface 165. Cam follower 170 is connected via linkage 175 and spring 180 to rotate transporter 17 about pivot 185. Transporter cam follower 170 thus is adapted to cause movement of the media with respect to fastener head 22 and the remainder of the apparatus, e.g. to guide media to or from a fastening position and/or to eject media from device 10.

Motor 30 is illustrated in a generally vertical orientation in FIG. 8, instead of the alternative, generally horizontal orientation shown in e.g. FIG. 1. Motor 30 rotates cam 160 via belt or band 190 and beveled gearing 192. Motor 30 also rotates cams 105, as described earlier herein, via belt or band 102 and beveled gearing 192. Accordingly, single motor 30 drives both transporter assembly 15, including transporter 17, and closing assembly 25, including closing mechanisms 27.

Figure 9:
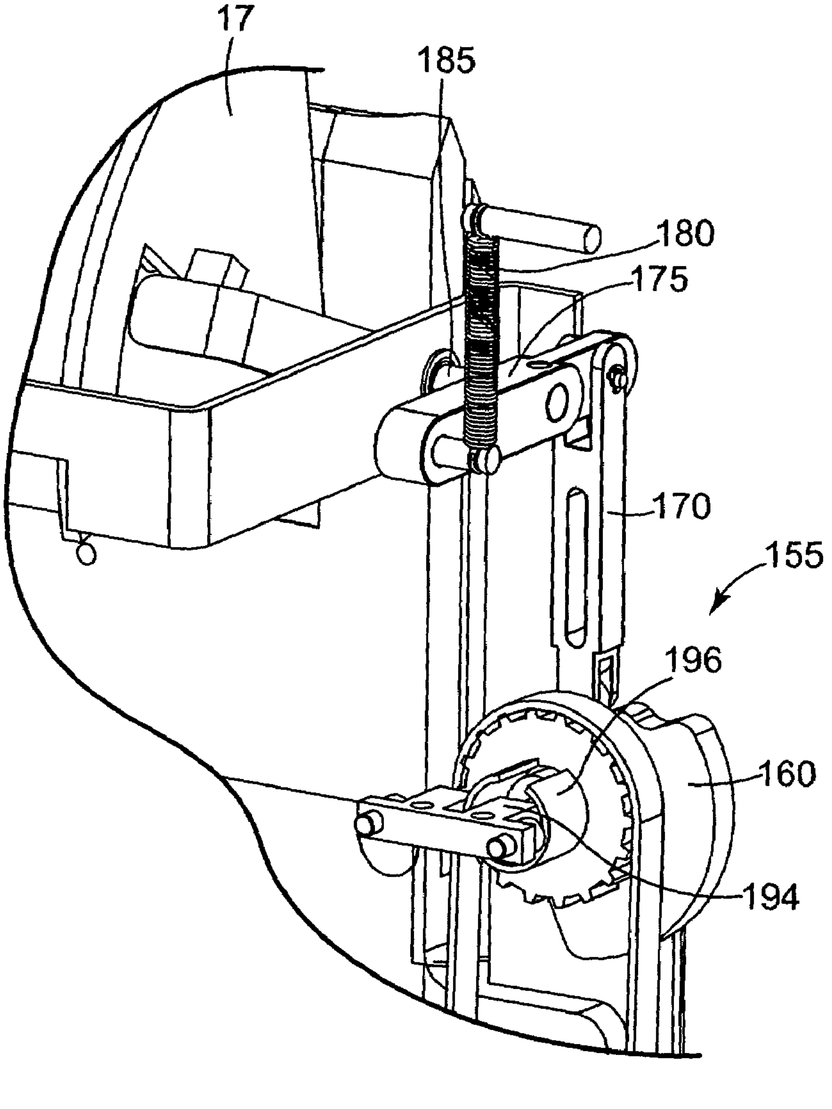
FIG. 9 is a perspective view of a portion of the FIG. 1 device, according to an embodiment of the invention.

FIG. 9 is a closer-in view of transporter actuation mechanism 155 and shows optical sensor 194 for detecting passage of flag 196 that is disposed to rotate with transporter cam 160. Sensor 194 and flag 196 are used to determine and coordinate the position of transporter 17. Sensor 194, previously described sensor 99, previously described solenoid 152, and/or other sensors or devices, sense and coordinate movement of transporter assembly 15, fastener heads 22, closing mechanisms 27, and/or other portions of device 10.

Figure 10A:
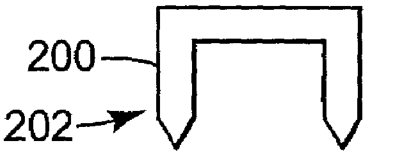
FIGS. 10A and 10B show a fastener in open and closed positions, according to an embodiment of the invention.
Figure 10B:
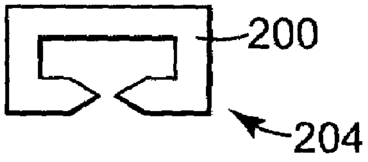

FIGS. 10A–10B illustrate fastener 200. Fastener 200 is a staple or any other device for securing media. Fastener 200 is movable between open position 202 (FIG. 10A) and closed position 204 (FIG. 10B), according to embodiments of the invention.

Figure 11:
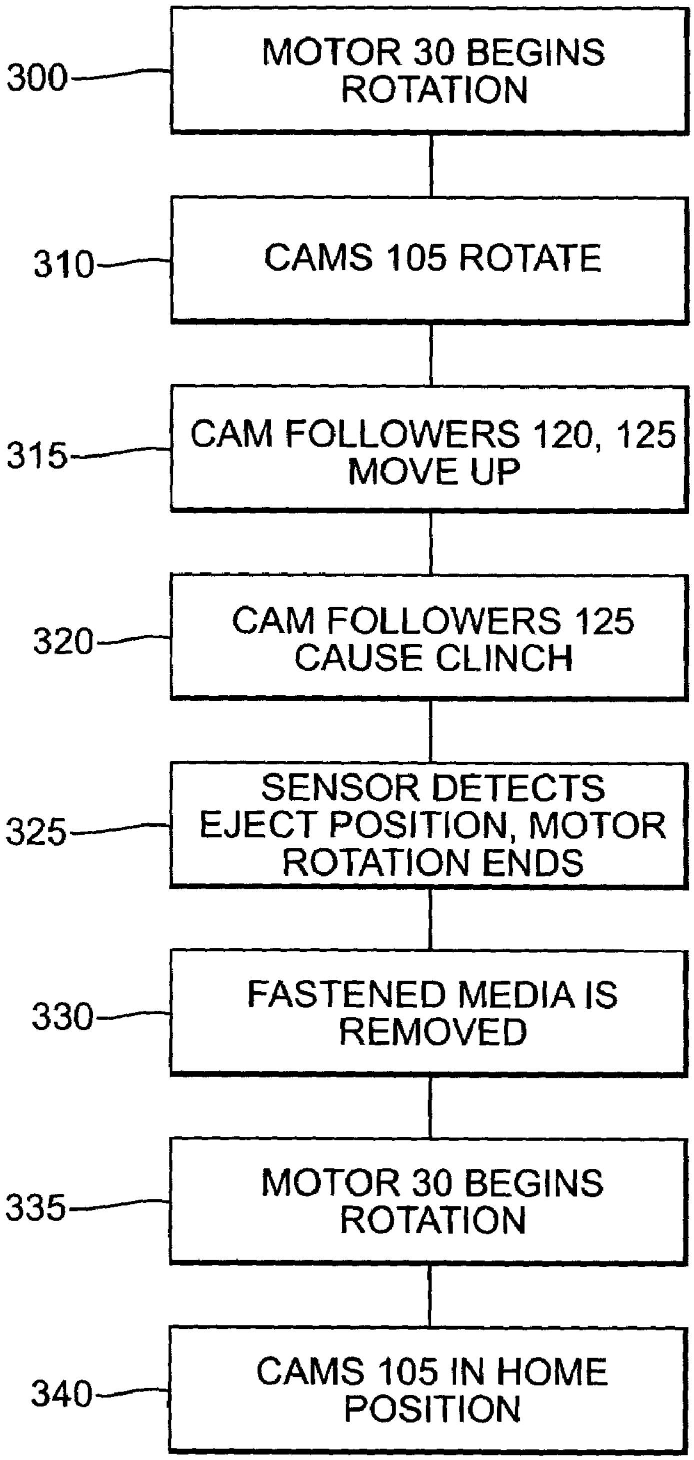
FIG. 11 is a flow chart showing a method of operation, according to an embodiment of the invention.
Figure 12:
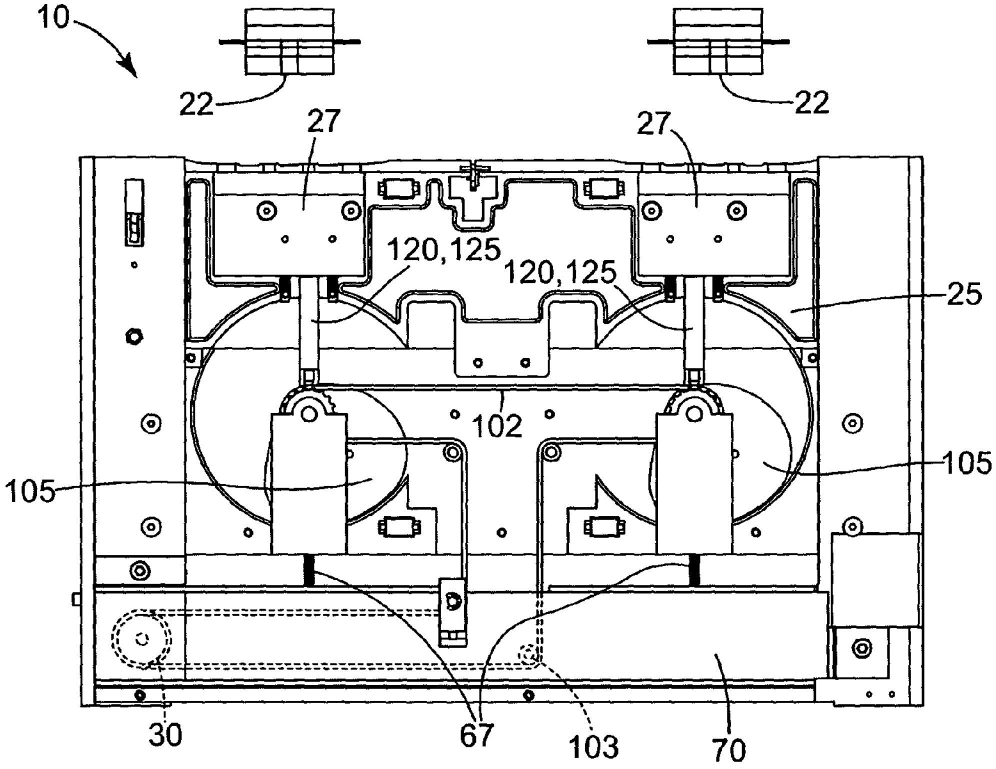
FIG. 12 is a side view showing a home position of the FIG. 1 device, according to an embodiment of the invention.
Figure 14:
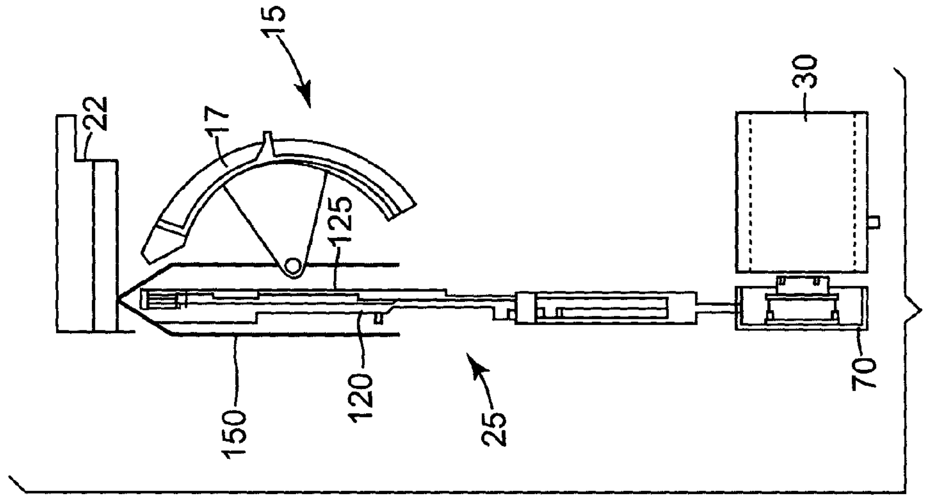
FIG. 14 is an end view showing a stapling position of the FIG. 1 device, according to an embodiment of the invention.
Figure 13:
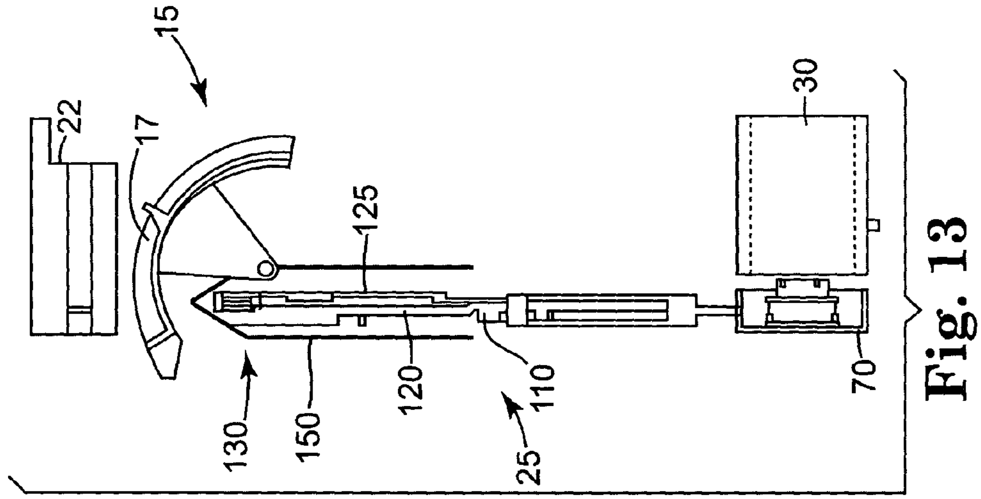
FIG. 13 is an end view showing a home position of the FIG. 1 device, according to an embodiment of the invention.

FIG. 11 depicts a method of operation according to an embodiment of the invention. FIGS. 12–18 depict features and aspects of device 10 associated with the FIG. 11 method. As shown at 300 in FIG. 11, motor 30 begins rotation. Cams 105, associated cam surfaces 110, 115, cam followers 120, 125 and closing mechanisms 27 are in a home position, as shown in FIGS. 12 and 13. Media 150, e.g. a stack of sheets or a booklet, is positioned over closing assembly 25. According to this embodiment, media 150 is centered over closing assembly 25 such that the bend in the media is centered in the media, but other media placement, e.g. at one end of media 150 such that the bend in the media is off-center, also is contemplated. At 310, cams 105 rotate counterclockwise as viewed in FIG. 12. At 315, cam followers 120, 125 move upwardly, causing closing assembly 25 to engage media 150 and move it upwardly into contact with fastener head 22, as shown in FIG. 14. Transporter 17 has rotated out of the travel path of closing assembly 25, as shown.

Figure 15:
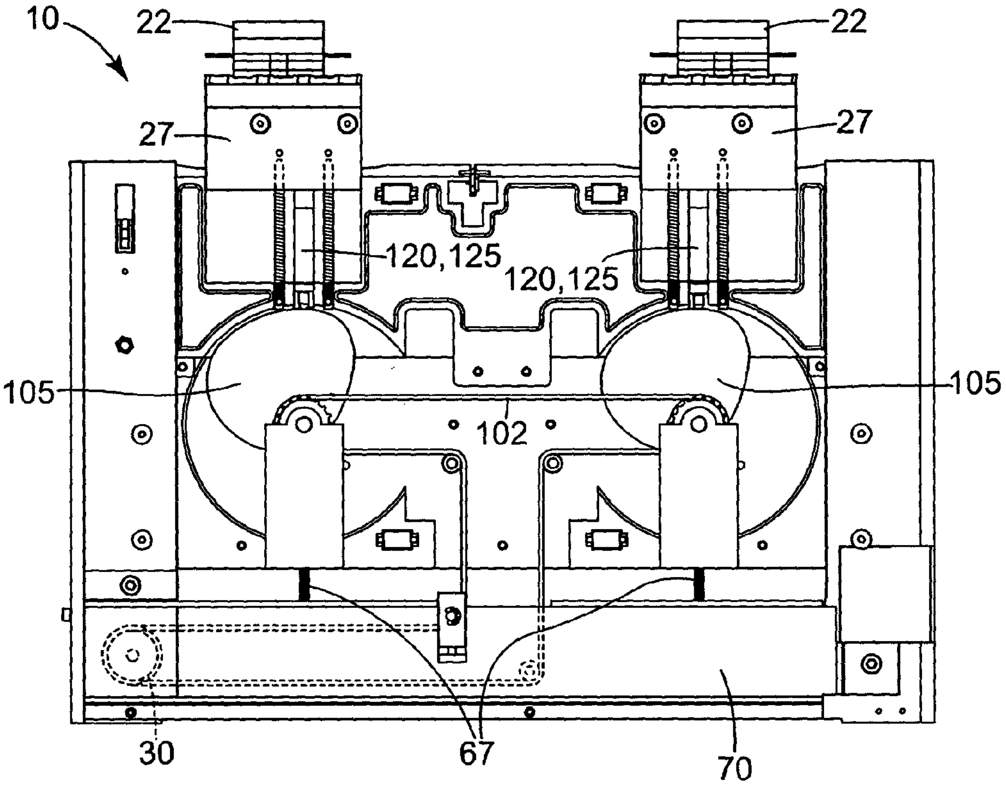
FIG. 15 is a side view showing a staple-and-clinch position of the FIG. 1 device, according to an embodiment of the invention.
Figure 16:
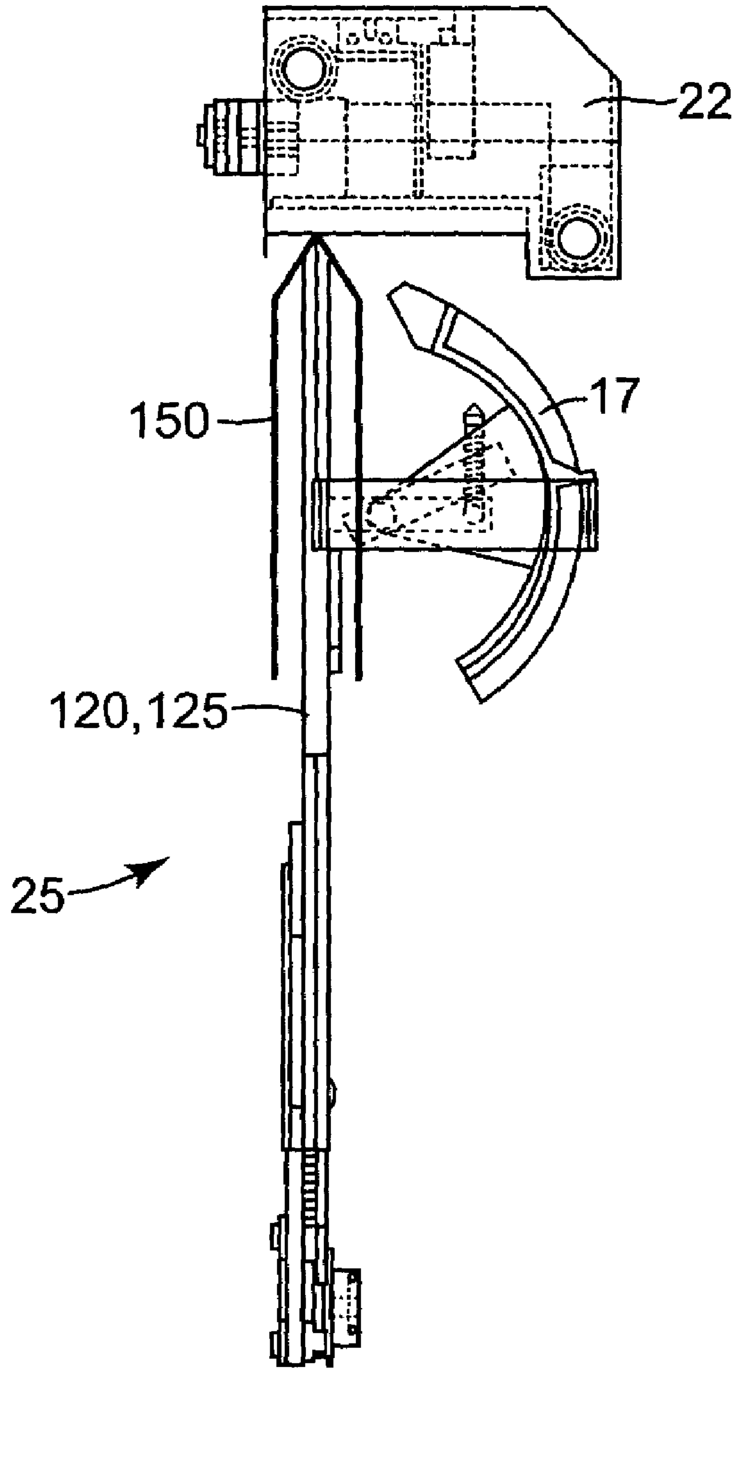
FIG. 16 is an end view showing a staple-and-clinch position of the FIG. 1 device, according to an embodiment of the invention.
Figure 17:
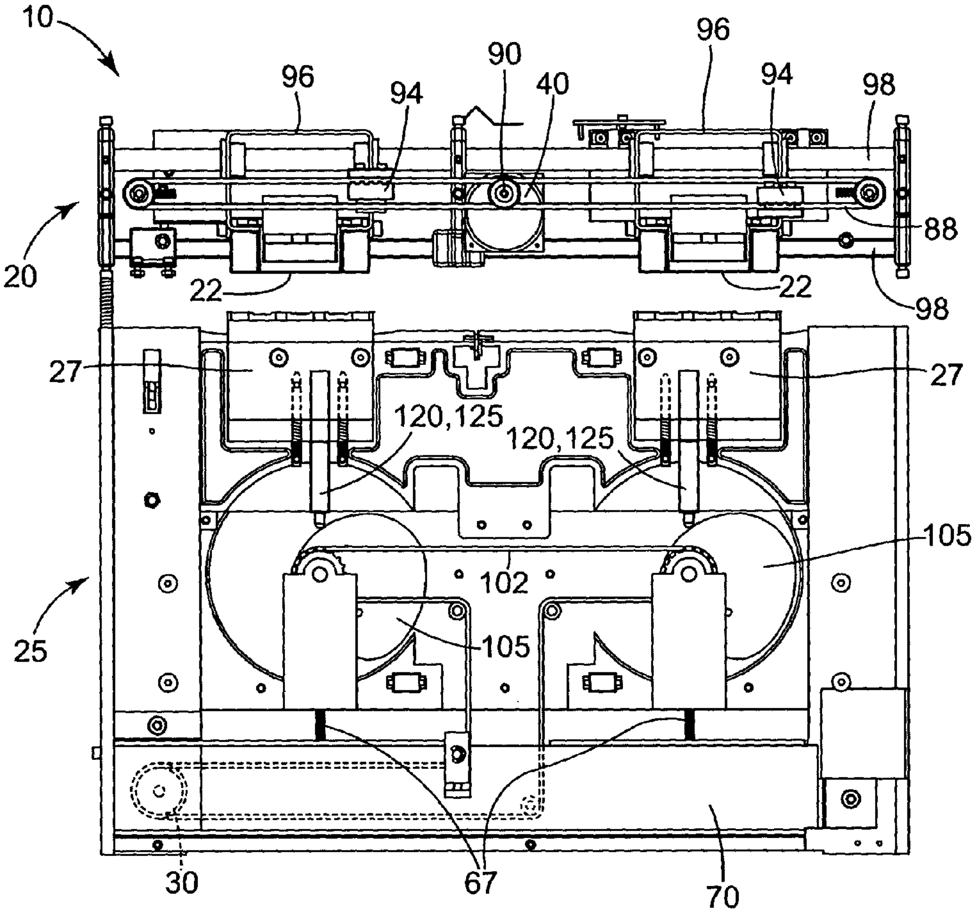
FIG. 17 is a side view showing an eject position of the FIG. 1 device, according to an embodiment of the invention.
Figure 18:
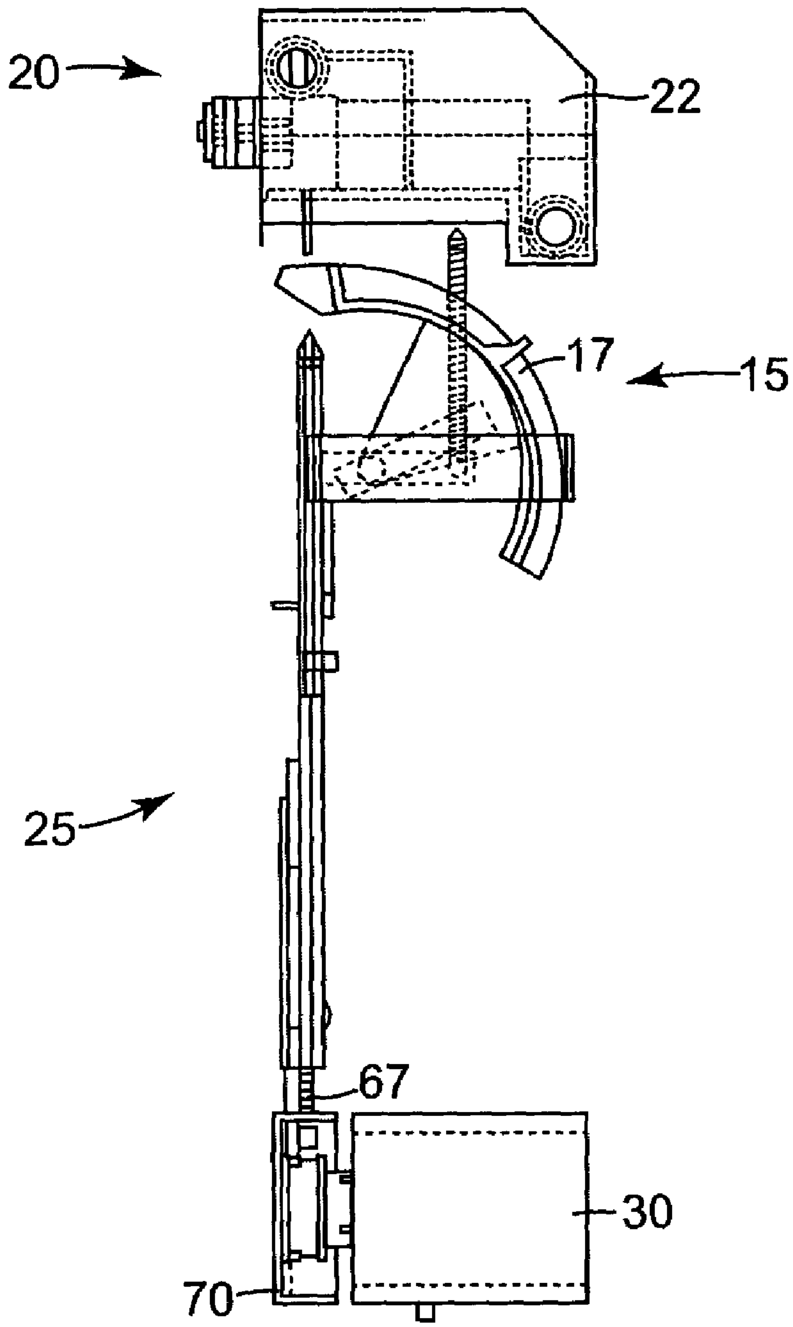
FIG. 18 is an end view showing an eject position of the FIG. 1 device, according to an embodiment of the invention.

At 320, cam follower 125 and second saddle member 140 extend with respect to first saddle member 132, to clinch fastener 200 into closed position 204. FIGS. 15–16, for example, show the staple-and-clinch position of device 10. Rotation of cam 105 continues, and at 325, sensor 194 senses flag 196 on transporter cam 160, thereby detecting an eject position and stopping rotation of motor 30. FIGS. 17–18, for example, show the eject position of device 10. The stapled or otherwise fastened media 150 now is ready for transport out of device 10, or is already at least partially transported or guided by transporter 17. Motor 30 remains in a stopped state until media 150 is removed, at 330. Motor 30 then rotates again, at 335, to return cams 105 and their associated components to the home position, at 340. In the home position, cams 105 and the associated components are in position for stapling of a subsequent job.

Figure 19:
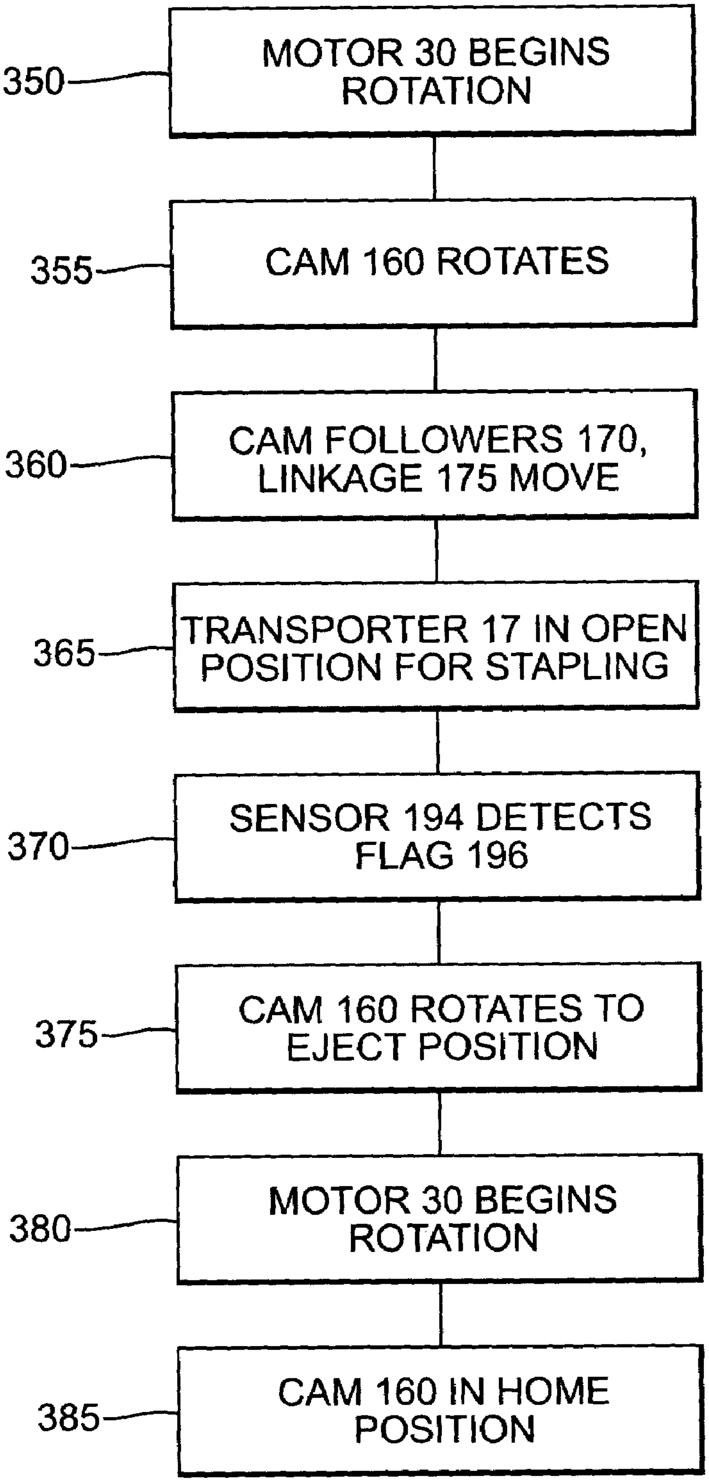
FIG. 19 is a flow chart showing a method of operation, according to an embodiment of the invention.
Figure 20:
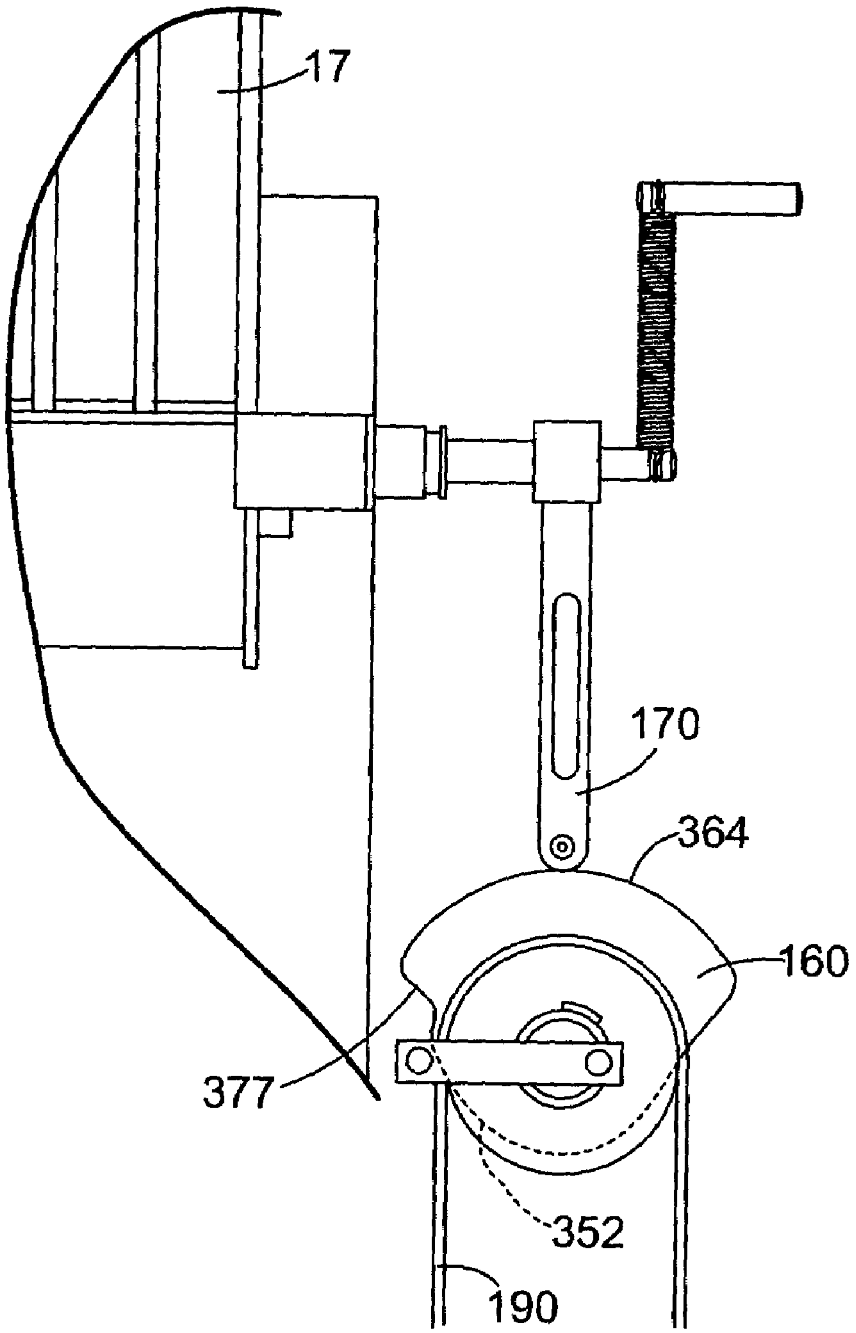
FIG. 20 is a side view of a portion of the FIG. 1 device, according to an embodiment of the invention.

Movement of transporter 17 now will be described with respect to FIGS. 19–20. At 350, motor 30 begins rotation, with transporter 17 and transporter cam 160 in a home position. Specifically, transporter cam follower 170 contacts transporter cam 160 at home position 352 thereof, depicted in FIG. 20. Transporter 17 is in a corresponding home position, which is illustrated in previously described FIG. 13. At 355, transporter cam 160 begins rotating clockwise as viewed in FIG. 20. At 360, cam follower 170 and linkage 175 move accordingly. Before the intersection point between cam follower 170 and cam 160 reaches highest cam position 364 as indicated in FIG. 20, transporter 17 is in a completely open position, at 365, and remains there until cam 160 reaches a “full-down” position. The open position of transporter 17 is a stapling position for fastening device 10. Transporter 17 optionally helps move or guide media 150 into a position for fastening. At 370, sensor 196 detects passage of flag 194 and thus detects one motor rotation. At 375, transporter cam 160 continues rotating until the intersection between cam follower 170 and cam 160 reaches eject position 377, shown in FIG. 20. Motor 30 then stops, and transporter 17 remains in place, as in e.g. previously described FIG. 18, until the fastened stack or other media 150 is removed. Transporter 17 optionally helps move or guide media 150 out of fastening device 10. At 380, motor 30 begins rotation again until cam 160 and its associated structure return to a home position, at 385. Transporter 17 is designed and actuated to accommodate or properly position media 150 below fastener heads 22, to move out of the way such that media 150 is free to engage fastener heads 22, and then return to a position e.g. below fastener heads 22 while or for the purpose of ejecting media 150.

The following functionality time chart shows time correspondence between fastener assembly 20, closing assembly 25, and transporter assembly 15, in keeping with the methods described above.

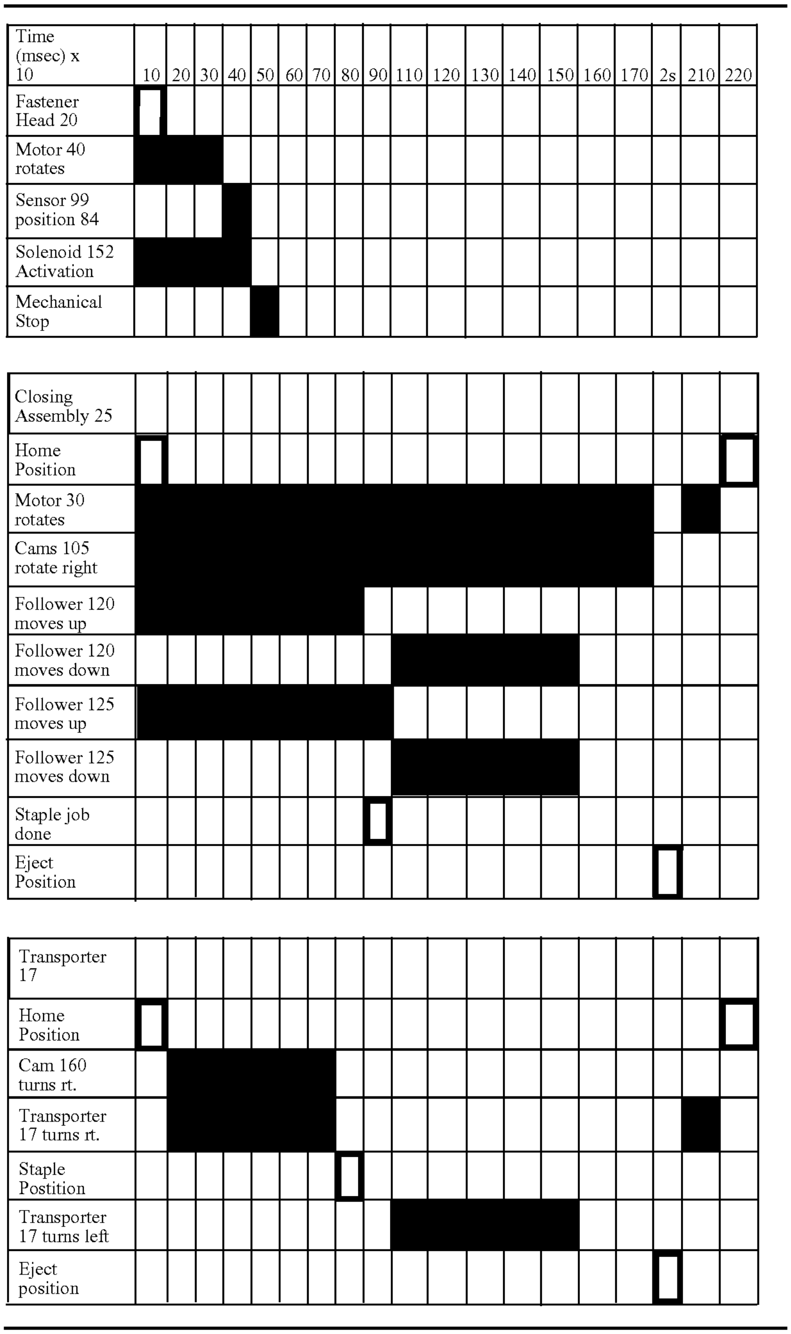

Figure 21:
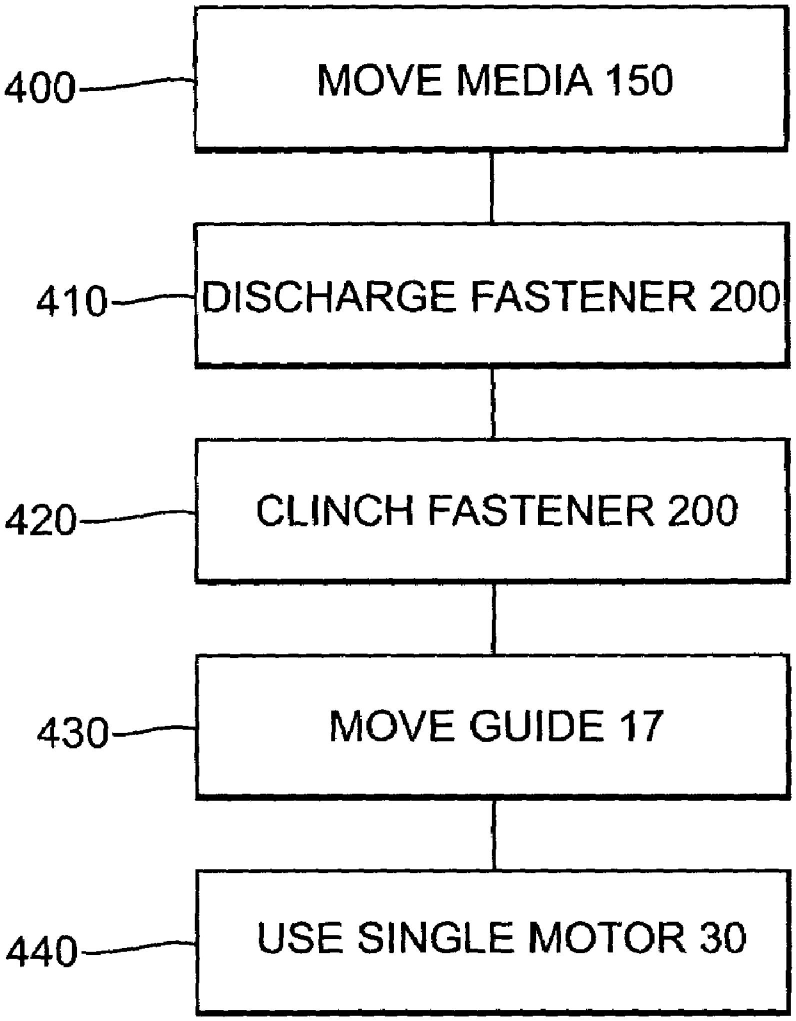
FIG. 21 is a flow chart showing a method of operation, according to an embodiment of the invention.

According to an embodiment of the invention illustrated in FIG. 21, a method of fastening media includes moving media 150 into contact with a fastener head, at 400. At 410, fastener 200 is discharged from fastener head 22 into media 150. At 420, the method includes clinching fastener 200 with clinch 80 to bind media 150, and, at 430, moving transporter or guide 17 between clinch 80 and fastener head 22, guide 17 being used to guide media 150. The method further includes, at 440, using single motor 30 to accomplish at least moving 400 of the media, clinching 420, and moving 430 of guide 17.

Figure 22:
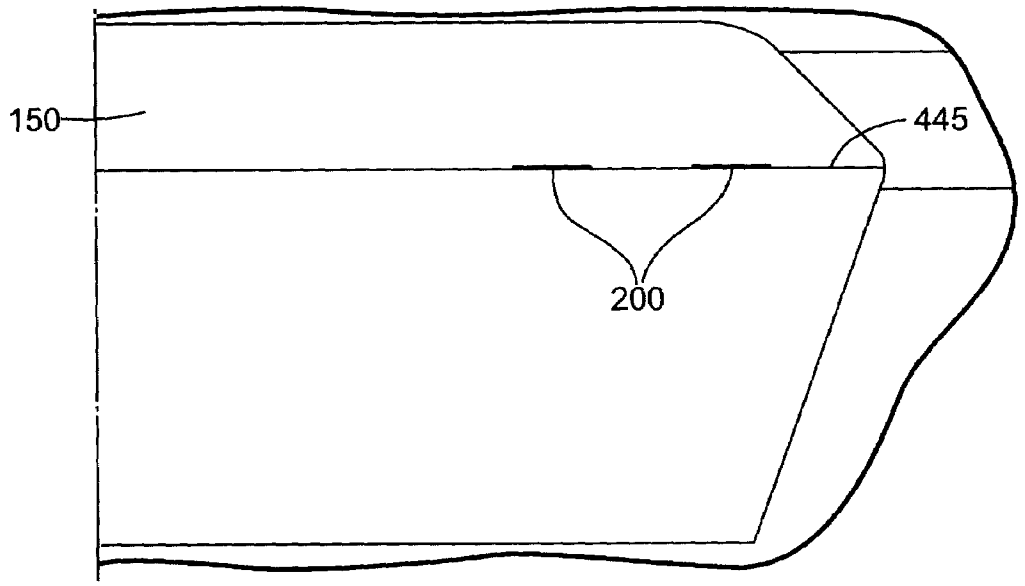
FIG. 22 shows stapled media in the form of a booklet, according to an embodiment of the invention.

Discharging 410 comprises generally simultaneously discharging a plurality of fasteners 200 into media 150 using a plurality of fastener heads 22. Clinching 420 comprises generally simultaneously clinching the plurality of fasteners 200. Using 440 comprises using single motor 30 to accomplish the simultaneous discharging and the simultaneous closing. The simultaneous discharging and the simultaneous closing form media 150 into a stack of fastened media, e.g. a booklet, illustrated in e.g. FIG. 22. FIG. 22 illustrates two fasteners 200, discharged at first fastener-discharge position 84 and second fastener-discharge position 86. According to one embodiment, two additional fasteners 200 are discharged and fastened in media 150 at an opposite end of spine 445 of fastened media 150. Alternatively, only two fasteners 200 are discharged, one at each end of spine 445.

The method further includes initializing fastener heads 22 at initialization position 82, and moving fastener heads 22 from initialization position 82 to position 84 and/or 86 for simultaneously discharging fasteners 200. The method further includes biasing media 150 toward fastener head 22 to provide compliance and to generally minimize jamming of media in device 10.

Figure 23:
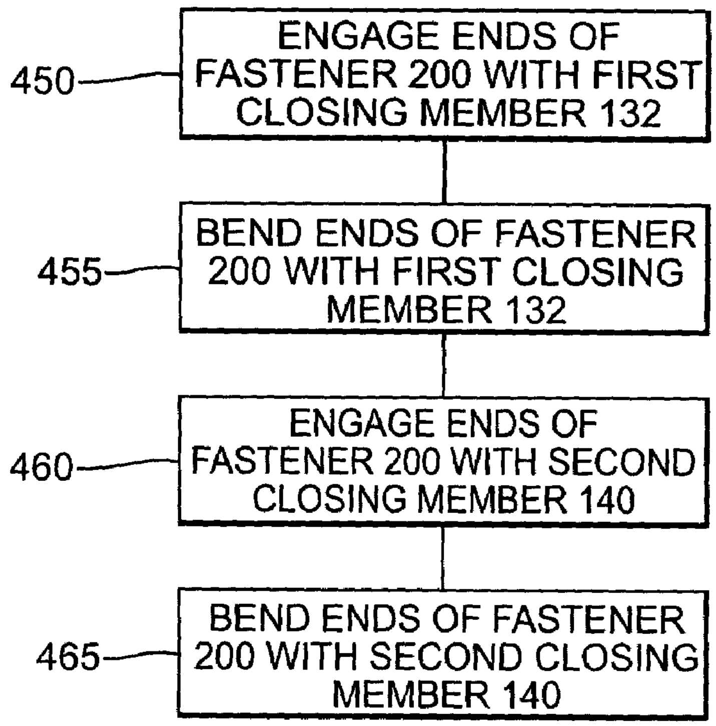
FIG. 23 is a flow chart showing a method of operation, according to an embodiment of the invention.

According to an embodiment of the invention illustrated in FIG. 23, a method of closing fastener 200 comprises engaging, at 450, ends of fastener 200 with first closing member 132, bending, at 455, the ends of fastener 200 with the first closing member 132, engaging, at 460, the ends of fastener 200 with second closing member 140, second closing member 140 being supported by first closing member 132 for movement therewith and being movable relative to first closing member 132, and bending, at 465, the ends of fastener 200 with second closing member 140 to close fastener 200. The engaging 450 with first closing member 132 comprises moving both first closing member 132 and second closing member 140 toward a fastener-dispensing location. The bending 460 with second closing member 140 comprises moving second closing member 140 relative to first closing member 132.

Figure 24:
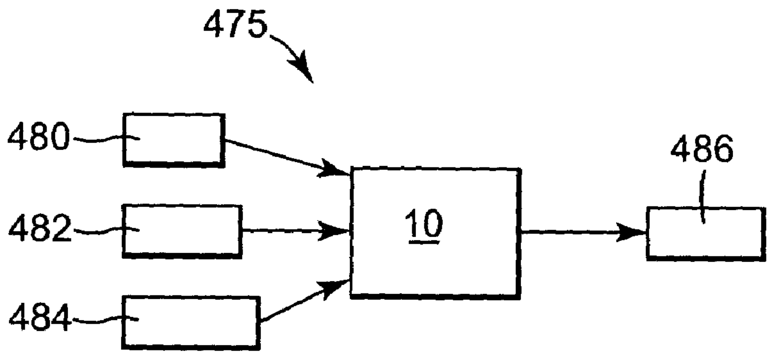
FIG. 24 shows a media fastening system, according to an embodiment of the invention.

FIG. 24 schematically illustrates media fastening system 475. System 475 optionally includes one or more of printer or printing output 480, photocopier or photocopying output 482, and facsimile device or other media output 484, for supplying media to fastening device 10 described herein. Fastening device 10 then optionally supplies fastened media to fastening-device output 486, where further processing optionally occurs, for example binding, boxing, punching, trimming, or other processing.

Embodiments of the invention provide a number of advantages. Multiple fasteners 200 are applied to media 150 and then clinched, all generally simultaneously, in a relatively compact space and with relatively few moving parts, in a relatively short amount of time. Besides speed, simplicity and compactness, the fastening, fastener-clinching, and/or transporting or guiding of media 150 all occur based on actuation of a single motor 30. An additional motor 40 moves fastener heads 22 to multiple positions based on e.g. the size of the media to be fastened, but the acts of discharging fasteners 200 from fastener 25 head 22 and closing them are accomplished by movement of closing assembly as driven by single motor 30, once motor 40 has driven fastener heads 22 to a desired location. Fastener heads 22 optionally are commercial, off-the-shelf or specialized staple heads or other fastener discharging devices. Additionally, embodiments of the invention do not require complex software or firmware to actuate and monitor the various components of fastening device 10 to discharge fasteners 200, thereby reducing operational complexity.

The term "media" as used herein should be considered to include a single sheet or other element of media, and/or a stack of media, for example. The term "stack" as used herein should be considered to include two or more sheets or other elements of media in a generally or partially overlying configuration, for example. Media according to embodiments of the invention includes not only paper, but also cloth or other fabric, plastic, or any other material that is capable of fastening by staples or other fasteners. Such media also optionally includes sheets, pages, covers, transparencies, or other elements of a book, booklet, folder or other fastened stack. In the case where the fasteners are staples, fastener heads 22 then each comprise a staple head. Other fasteners besides staples are also contemplated.

Although specific embodiments have been illustrated and described herein, it will be appreciated by those of ordinary skill in the art that a wide variety of alternate and/or equivalent implementations calculated to achieve the same purposes are optionally substituted for the specific embodiments shown and described without departing from the scope of the present invention. Embodiments of the invention, for example, are useable with a wide variety of external devices such as printers, copiers, facsimile machines, and other output devices or other devices. A wide variety of materials is contemplated for use for the various disclosed structural components, e.g. steel of sufficient hardness, DELRIN acetyl resin, ABS plastic, and other materials. Each cam 105, for example, is constructed of a material of sufficient hardness to withstand an effectively unlimited number of repetitive movements, e.g. one million rotations or more, for example H-13 steel of Rockwell Hardness (HRC) 49-51. Directional terminology, such as up, down, left, right, over, under, above, below, etc. is used for purposes of illustration and description only, and is not intended necessarily to be limiting. Those with skill in the chemical, mechanical, electro-mechanical, electrical, and computer arts will readily appreciate that the present invention may be implemented in a very wide variety of embodiments. This application is intended to cover any adaptations or variations of the embodiments discussed herein.

What is claimed is:

1. Apparatus for closing fasteners in media, the apparatus comprising:

a plurality of fastener clinches, the plurality of fastener clinches being adapted for operable engagement with a plurality of fastener dispensers, the plurality of fastener clinches comprising structure adapted to generally simultaneously close a plurality of fasteners discharged by the fastener dispensers;

an actuation mechanism for moving the fastener clinches to contact and close the fasteners in the media; and a drive for powering the actuation mechanism, wherein the actuation mechanism comprises:

a plurality of cams; and a plurality of cam followers operably coupled with each cam.

2. The apparatus of claim 1, wherein each cam defines two cam surfaces, each cam surface being adapted to engage and move one of the cam followers operably coupled with the cam.

3. The apparatus of claim 2, wherein one of the cam followers for each cam is adapted to move a respective clinch toward a respective fastener; further wherein another of the cam followers for each cam is adapted to close the respective fastener in the media.

4. Apparatus for closing fasteners in media, the apparatus comprising:

a plurality of fastener clinches, the plurality of fastener clinches being adapted for operable engagement with a plurality of fastener dispensers, the plurality of fastener clinches comprising structure adapted to generally simultaneously close a plurality of fasteners discharged by the fastener dispensers;

an actuation mechanism for moving the fastener clinches to contact and close the fasteners in the media; and a drive for powering the actuation mechanism, wherein the drive comprises a single motor.

5. The apparatus of claim 4, in combination with a media transporter for moving media with respect to the fastener clinches, the media transporter being powered by the single motor.

6. The apparatus of claim 4, further comprising:

a frame for supporting the plurality of fastener clinches; and a compliant biasing device operably coupled with the frame and the plurality of fastener clinches, the compliant biasing device being adapted to bias the plurality of fastener clinches toward the fastener dispensers and to provide compliance between the plurality of fastener clinches and the frame.

7. The apparatus of claim 4, in combination with the plurality of fastener dispensers and with an ejector adapted to move fastened media from the apparatus.

8. A fastening device for media, comprising:

a transporter for transporting media with respect to the fastening device;

a fastener head for discharging a fastener into media transported by the transporter;

a closing mechanism for closing the fastener; and a motor for actuating both the transporter and the closing mechanism.

9. The fastening device of claim 8, wherein:

said fastener head is one of a plurality of fastener heads adapted to simultaneously discharge a plurality of fasteners into media transported by the transporter;

said closing mechanism is one of a plurality of closing mechanisms adapted to simultaneously close the plurality of fasteners; and the plurality of closing mechanisms and the transporter are actuated by the motor.

10. The fastening device of claim 9, further comprising another motor for moving the plurality of fastener heads to desired locations with respect to the media.

11. The fastening device of claim 9, wherein the fastener heads are adapted for movement to an initialization position, a first fastener-discharge position, and a second fastener-discharge position; further wherein the closing mechanisms are disposed to close fasteners discharged in both the first fastener-discharge position and the second fastener-discharge position.

12. The fastening device of claim 9, further comprising a support body for supporting the plurality of closing mechanisms, the support body being biased toward the plurality of fastener heads by a compliant biasing device to generally minimize jamming of the media.

13. The fastening device of claim 8, wherein the closing mechanism comprises structure adapted to operably engage the fastener head to discharge one or more fasteners.

14. The fastening device of claim 8, wherein the closing mechanism comprises:

two cam surfaces operably coupled with the motor; and two cam followers operably coupled with the two cam surfaces, the two cam surfaces being adapted to drive the two cam followers upon movement of the two cam surfaces, one of the two cam followers being adapted to cause movement of the media toward the fastener head for discharge of a fastener and the other of the two cam followers being adapted to cause closing of the fastener.

15. The fastening device of claim 14, wherein the transporter comprises:

a transporter cam surface operably coupled with the motor; and a transporter cam follower operably coupled with the transporter cam surface, the transporter cam surface being adapted to drive the transporter cam follower upon movement of the transporter cam surface, the transporter cam follower being adapted to cause movement of the media with respect to the fastener head.

16. The fastening device of claim 8, wherein the fastener head comprises a staple head for discharging a staple into the media; further wherein the closing mechanism comprises a staple clinch.

17. A saddle assembly for use in fastening sheets together, the saddle assembly comprising:

means for applying force to release a staple from a staple dispenser;

means for clinching the staple into a closed position, the means for clinching first moving together with the means for applying to both position the sheets and to apply the force, the means for clinching subsequently moving relative to the means for applying to clinch the staple; and means for actuating both the means for applying and the means for clinching.

18. The saddle assembly of claim 17, wherein the means for actuating comprises:

a first cam surface and a first cam follower; and a second cam surface and a second cam follower;

wherein the means for actuating drives the first cam surface and the second cam surface.

19. The saddle assembly of claim 17, wherein the means for actuating comprises a single motor.

20. A method of fastening media, the method comprising:

moving the media into contact with a fastener head;

discharging a fastener from the fastener head into the media;

clinching the fastener with a clinch to bind the media; and moving a guide between the clinch and the fastener head, the guide being used to guide the media; and using a single motor to accomplish at least the moving of the media, the clinching, and the moving of the guide.

21. The method of claim 20, wherein:

the discharging comprises generally simultaneously discharging a plurality of fasteners into the media using a plurality of fastener heads;

the clinching comprises generally simultaneously clinching the plurality of fasteners; and the using comprises using the single motor to accomplish the simultaneous discharging and the simultaneous closing.

22. The method of claim 21, wherein the simultaneous discharging and the simultaneous closing form the media into a booklet.

23. The method of claim 21, further comprising:

initializing the fastener heads at an initialization position; and moving the fastener heads from the initialization position to a position for simultaneously discharging the fasteners.

24. The method of claim 20, further comprising:

biasing the media toward the fastener head to provide compliance and to generally minimize jamming of the media.

* * * * *

UNITED STATES PATENT AND TRADEMARK OFFICE

CERTIFICATE OF CORRECTION

PATENT NO. : 7,093,339 B2
APPLICATION NO. : 10/644453
DATED : August 22, 2006

INVENTOR(S) : Francisco Javier Ramirez Aldana et al.

It is certified that error appears in the above-identified patent and that said Letters Patent is hereby corrected as shown below:

In column 4, line 25, delete “Comers” and insert -- Corners --, therefor.

In column 11, line 44, delete “25” before “head”.

In column 11, line 46, after “assembly” insert -- 25 --.

Signed and Sealed this

Twenty-fourth Day of February, 2009

JOHN DOLL
*Acting Director of the United States Patent and Trademark Office*